Oct. 19, 1954  C. MATARRESE  2,691,997
COMBINATION FOOD GRINDING, GRATING, PULVERIZING, SLICING
AND WEIGHING MACHINE
Filed March 3, 1949  5 Sheets-Sheet 1

INVENTOR.
CARLO MATARRESE.
BY
ATTORNEY.

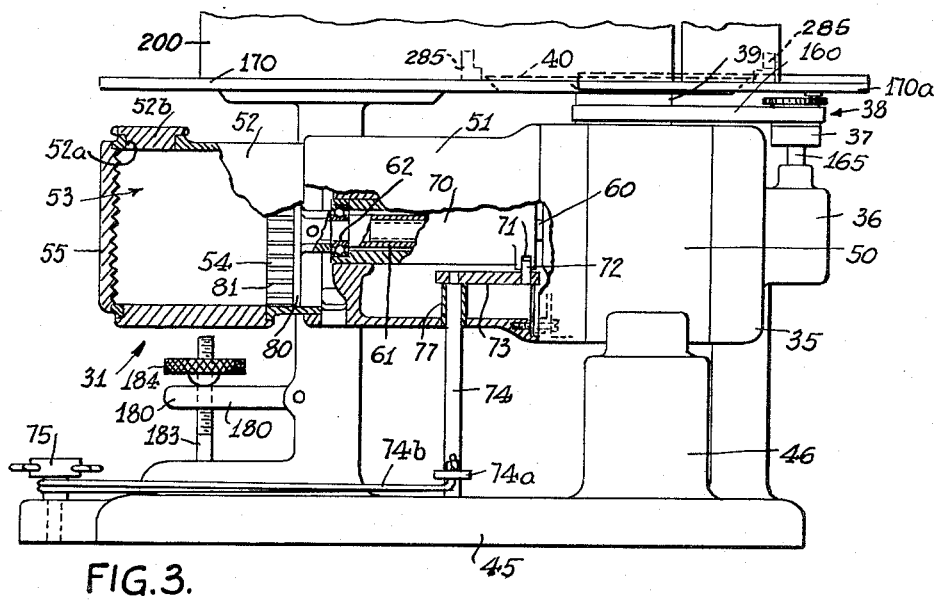
FIG.3.
FIG.4.
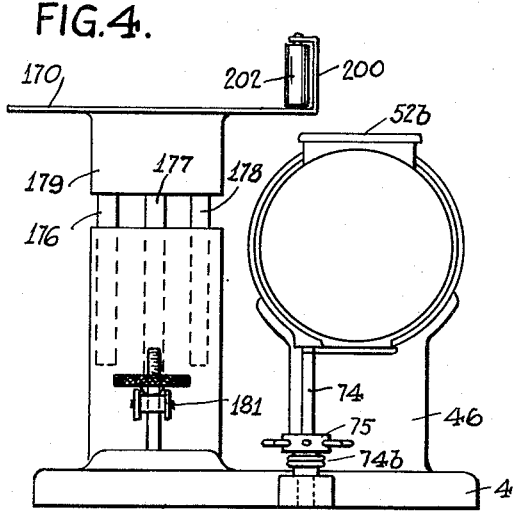
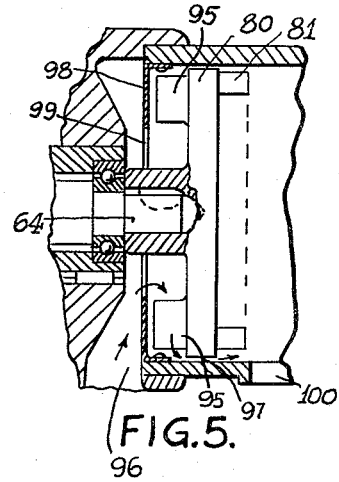
FIG.5.
FIG.18.
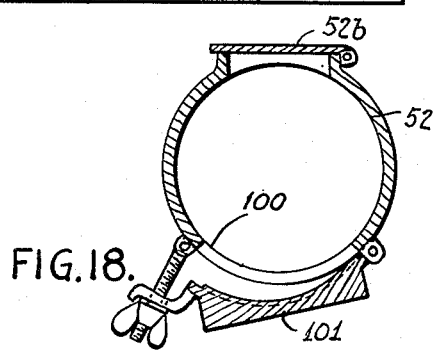
INVENTOR.
CARLO MATARRESE.
BY Samuel J Stoel
ATTORNEY.

INVENTOR.
CARLO MATARRESE.
BY
ATTORNEY.

Oct. 19, 1954
C. MATARRESE
2,691,997
COMBINATION FOOD GRINDING, GRATING, PULVERIZING, SLICING
AND WEIGHING MACHINE
Filed March 3, 1949
5 Sheets-Sheet 4
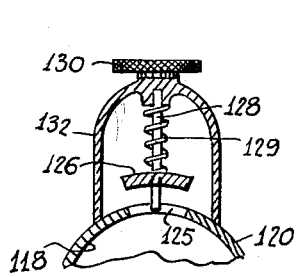
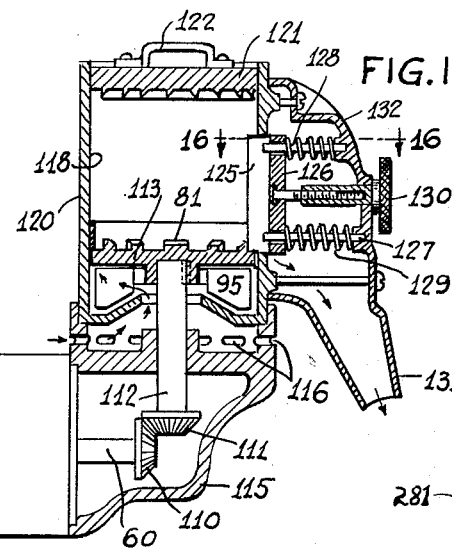
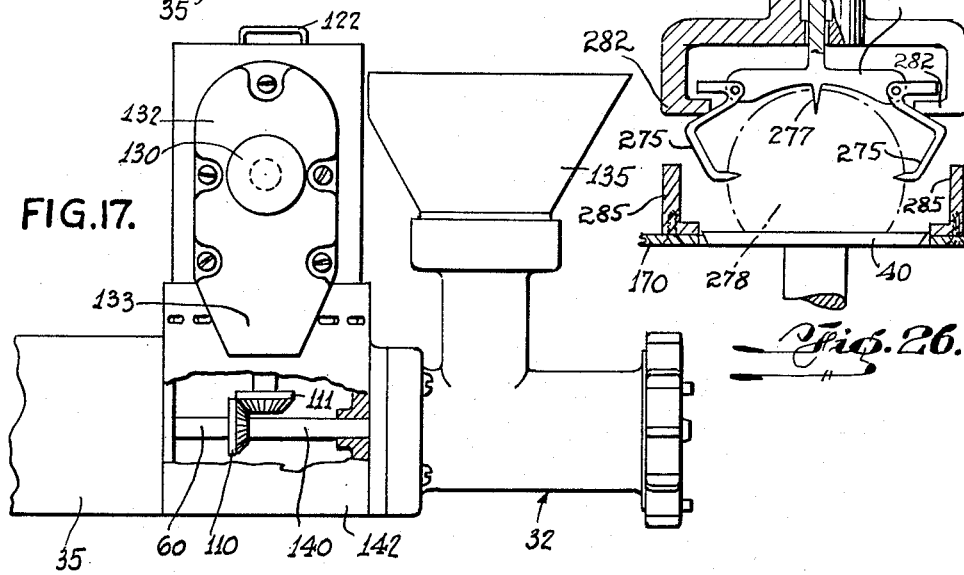
INVENTOR.
CARLO MATARRESE.
BY
Samuel J Stoll
ATTORNEY.

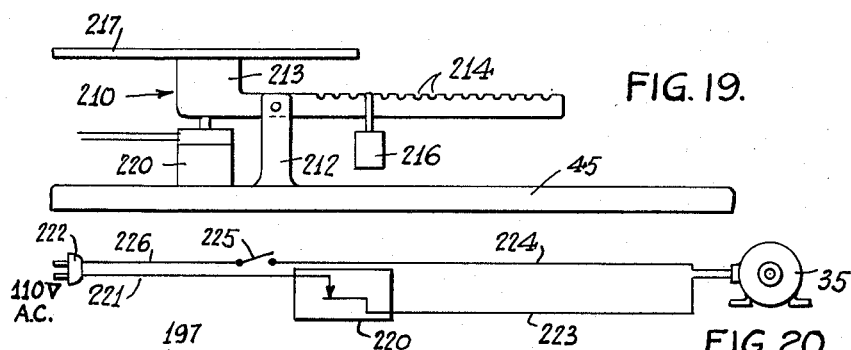
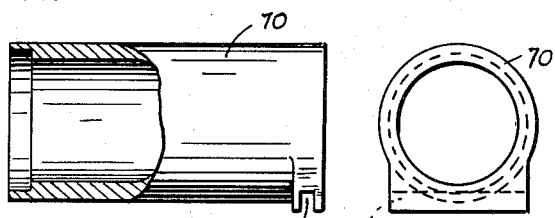
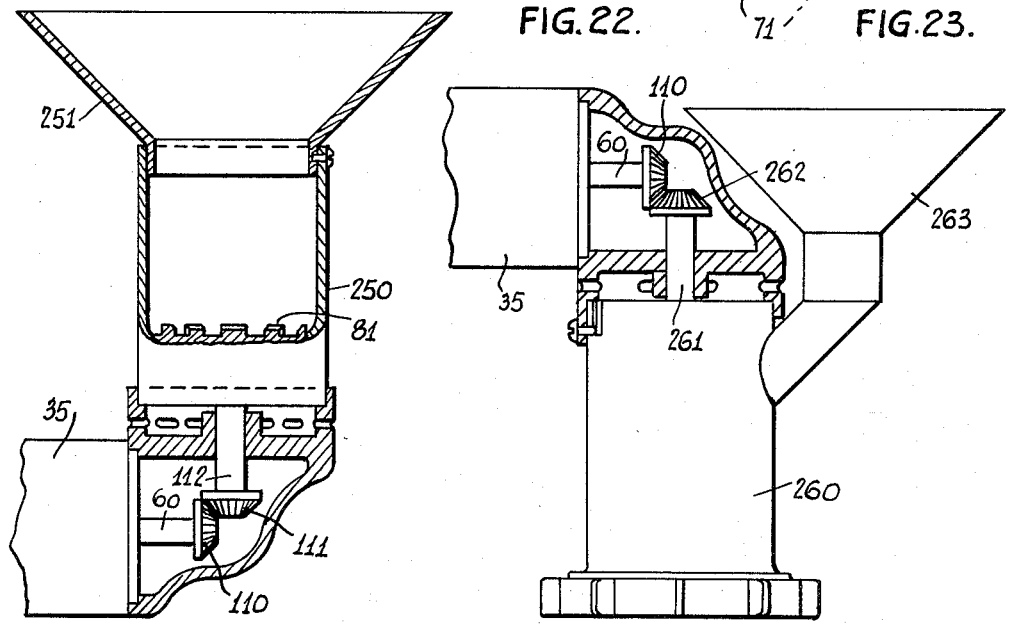
INVENTOR.
CARLO MATARRESE.

Patented Oct. 19, 1954

2,691,997

UNITED STATES PATENT OFFICE 2,691,997

COMBINATION FOOD GRINDING, GRATING, PULVERIZING, SLICING, AND WEIGHING MACHINE

Carlo Matarrese, New York, N. Y.

Application March 3, 1949, Serial No. 79,384

13 Claims. (Cl. 146—182)

This invention relates to a combination food grinding, grating and slicing machine and it constitutes an improvement over the machine which is shown and described in my co-pending patent application, Serial No. 602,492, filed on June 30, 1945, now Patent No. 2,483,472, issued October 4, 1949.

The machine herein described and claimed is a universal machine in the sense that it is adapted to prepare virtually every kind of non-fluid food in the following ways:

Coffee beans, cereals, meats, bones, nuts and similar foods may be ground or pulverized on this machine. Coconuts, vegetables, and certain fruits may be shredded on the machine. Cheese, vegetables, bread, fruit rinds and similar foods may be grated. Fruits, such as berries of every description, and vegetables may be reduced to pulp and juice on the machine under discussion. Fruits, such as olives and berries, such as cherries are treated in such manner that their pulp and juices are separated from their pits and the pits are discarded, whole and uncrushed to avoid contaminating the pulp and juices with the bitter oils that are contained in the pits. Cooked foods such as cooked potatoes and other vegetables may be mashed on the machine, and finally, prepared foods such as cheese, salami, ham, and other ready-to-eat meats may be sliced on said machine.

The machine of the present invention has two major parts: a slicing mechanism which performs all of the slicing operations above described and a grating or grinding mechanism which, with a single set of cutting teeth, grates, grinds and pulverizes every food which may be grated, ground or pulverized.

The principal object of this invention is the provision of a combination machine of the character described, which is driven by a single electric motor, and which includes all of the necessary cutters for accomplishing the work above described. More specifically the machine includes a motor driven food slicing knife and a grinding tool which is capable of grinding, grating, and shredding the different kinds of food herein contemplated. The same motor drives both the slicer and the grinder and a clutch is interposed between the motor and the slicer so as to render the slicer individually and independently operative. The combination of a slicer and a grinder in the same machine renders the machine highly useful in commercial establishments as well as in domestic households. Heretofore it has been necessary to purchase two separate machines, one capable of slicing the food and the other of grinding it. Not only has this been unduly expensive, especially for small establishments, but it has also been wasteful of space, in that the two machines required twice as much space, generally on a counter, as the machine under discussion.

Another object of this invention is the provision of a machine of the character described in which the grinding element rotates on a vertical axis and is provided with a vertically movable food follower. In other grinding machines of this general character, the grinding element rotates on a horizontal axis and the food follower moves on a horizontal plane. There is accordingly unequal distribution of the food in the grinder and correspondingly un-uniform grinding action upon the food. This is especially true when there is unsufficient food to fill the housing of the grinder. In the present invention on the other hand, it is immaterial how much food the housing contains since it is all equally distributed with respect to the grinding element. There are other advantages in the present design of a vertical grinding unit and among these may be mentioned the fact that it is exceedingly easy to attach a chute to the present grinder for continuous grinding of food in large commercial establishments. This highly important feature derives from the vertical structure of the present machine, since the feeding chute would itself be maintained in substantially vertical position. In this design, gravity may be used as the propelling force that moves the food into uninterrupted engagement with the grinding element.

A further object of this invention is the provision of a machine of the character described in which the grinding element includes a plurality of vane-shaped cutting teeth, which are so arranged as to be suitable for sharpening with a conventional file. These cutting teeth may be integral with the head of the cutting element and indeed they may constitute an integral part of the head casting, being made of the same material, or they may comprise steel teeth cast into an aluminum head. If desired, they may be of the replaceable variety, held in place on the grinding head by means of screws. These cutting teeth are arranged in a plurality of radial lines, the teeth of each radial line or row being spaced or separated from each other. They are vane shaped and relatively long and wide, so that when they rotate with the grinding head they serve as fan elements to generate and direct a current of air against the ground food. This is an extremely important feature, since the current of air thus generated cooperates with the spaces between the teeth to keep the teeth clean and free of food deposits. The current of air which these vane-shaped grinding teeth generate tends to blow the ground food away from the teeth to make room for the food which has yet to be ground.

The current of air which is generated by the vane-shaped grinding or grating teeth is augmented by a current of air which is generated by a plurality of fan blades which are connected to the back of the grinding or grating head. The combined current of air is quite strong and it not only tends to blow the ground or grated food away from the cutting teeth but it also produces a drying or seasoning effect upon said ground or grated food. The shape of the cutting teeth makes it possible to grate fresh cheese and the current of air which is blown against the grated cheese produces a very marked drying and seasoning effect upon it.

Still another object of this invention is the provision of a machine of the general character described in which fan elements are connected to the back of the grinding head to generate a current of air through the grinding housing for substantially the same purposes as have been above described in regard to the vane-shaped grinding teeth. The fan elements on the back of the grinding head generate a current of air which is directed against the ground or grated food to move said food away from the grinding elements. Not only does the air current accomplish this result but in certain cases, it also assists in drying the ground or grated food. This is especially true where the grinding element is used to grate cheese. The current of air which the fan elements generate blows the grated cheese away from the grinding teeth and in so doing, the air produces a marked drying effect upon the grated cheese.

A still further object of this invention is the provision of a combination machine of the character described in which the slicing cutter rotates in a horizontal plane, on a vertical axis. The table on which the food rests as it is being moved into and out of engagement with the cutting knife is also disposed on a horizontal plane. The table height is adjustable to provide for thicker or thinner food slices. It is also horizontally adjustable to compensate for wear in the cutting edge of the knife, so that the edge of the table and the edge of the knife may be maintained in close proximity to each other, irrespective of the extent of the wear in the knife.

Another important object of the present invention is the provision of an adjustably mounted back stop for the food on the slicing table. This back stop is adjustable with respect to the center of the slicing knife, so that it may be removed farther away from or brought nearer to the central axis of said slicing knife. There are marked advantages in this feature since the back stop, properly positioned, may enable the slicing knife to pull the food along with it as it slices the same. Hence the slicing knife may be used not only to cut slices in the food when the food is brought into engagement therewith but also to assist in bringing the food into such engagement. This adjustability feature in the back stop of the machine is also valuable when it is desired to cut foods of many sizes and shapes on said machine. For example, the back stop may be positioned in one place relative to the central axis of the cutting knife to slice food of relatively small dimensions, such as a length of salami, and it may be positioned elsewhere relative to said central axis of the cutting knife when food of larger dimensions is cut, such as for example, a large segment of Swiss cheese.

A corollary object of the invention is the provision of a machine of the character described in which the back stop on the slicing unit is provided with food engaging rollers to assist the slicer in moving the food along as it is being sliced. The use of rollers in this connection reduces the friction between the back stop and the food and facilitates moving the food along with respect to the cutting element.

A further important object of the invention is the provision of a machine of the character described in which a scale is connected to the slicing unit to receive the slices of food therefrom, the connection between said scale and the slicing unit being such as to enable the scale to control the operation of the slicing unit. By way of illustration, the scale may be set to a reading of two pounds. When the slices of food deposited upon the scale attain a weight of two pounds, a switch is actuated and the current to the electric motor which drives the slicing element is thereby cut off and the slicing operation ceases. This is a highly valuable feature in busy commercial establishments since there is no need to weigh the sliced food after the slicing operation is completed. At the present time, the clerk slices what he deems to be a sufficient quantity of food and then he carries the sliced food over to a scale to ascertain whether or not he guessed correctly. If the weight appears insufficient, he then goes back to the slicing machine and cuts additional slices of food. He then adds these additional slices to the quantity on the scale and again he may or may not have guessed correctly. If too many slices were initially cut, then the superfluous slices must be stored to await another customer desiring the same article. In the machine under discussion, however, the appropriate scale reading is set before the slicing operation commences and the machine automatically discontinues the slicing operation as soon as the required weight has been attained.

Preferred forms of this invention are shown in the accompanying drawing in which:

Fig. 3 is a back view, partly broken away and in section to expose the grinding element and the driving mechanism which drives said grinding element;

Fig. 4 is an end view thereof;

Fig. 5 is an enlarged sectional view through a modified form of grinding element, showing fan blades attached thereto for creating a current of air and directing it against the ground food;

Fig. 15 is an enlarged sectional view through a modified form of grinding element, said element being shown mounted for rotation on a vertical axis, the food follower being shown movable vertically of said grinding element;

Fig. 16 is a sectional view on the line 16—16 of Fig. 15 showing an adjustable door on the outlet opening of the food chamber to control the fineness or coarseness of the grinding action;

Fig. 17 is a view similar to that of Fig. 15, of a modified form of grinding attachment, wherein the grinding element occupies a position 90° removed from the position of the grinding element in Fig. 15, and also showing a meat grinding attachment connected to the same driving mechanism;

Fig. 18 is a section through the grating housing showing the adjustable door which serves as a closure for its outlet opening and showing also the door to the inlet opening at the top of said housing;

Fig. 19 is a diagrammatic view of a scale and switch mechanism which receives the sliced food from the slicing machine and automatically stops the slicing operation when a predetermined weight of food has been deposited thereon;

Fig. 20 is an electric wiring diagram by which the scale of Fig. 19 is adapted to control the slicing mechanism;

Fig. 21 is an enlarged and partly sectional view of the table and slicer showing a sharpening element mounted on the table for engagement with the slicing element, said view being taken on the line 21—21 of Fig. 2;

Fig. 22 is a side view, partly broken away and in section, of the main sleeve in the projecting mechanism by which the grating element is moved forwardly and backwardly in the grating chamber;

Fig. 23 is an end view thereof;

Fig. 24 is a sectional view through a vertical grating mechanism similar to that shown in Fig. 15, showing a delivery chute or hopper feeding into the grating chamber;

Fig. 25 is a side view, partly in section, of a meat grinder which extends vertically and downwardly;

Fig. 26 shows a food holder for use on the slicing mechanism.

Figure 2:
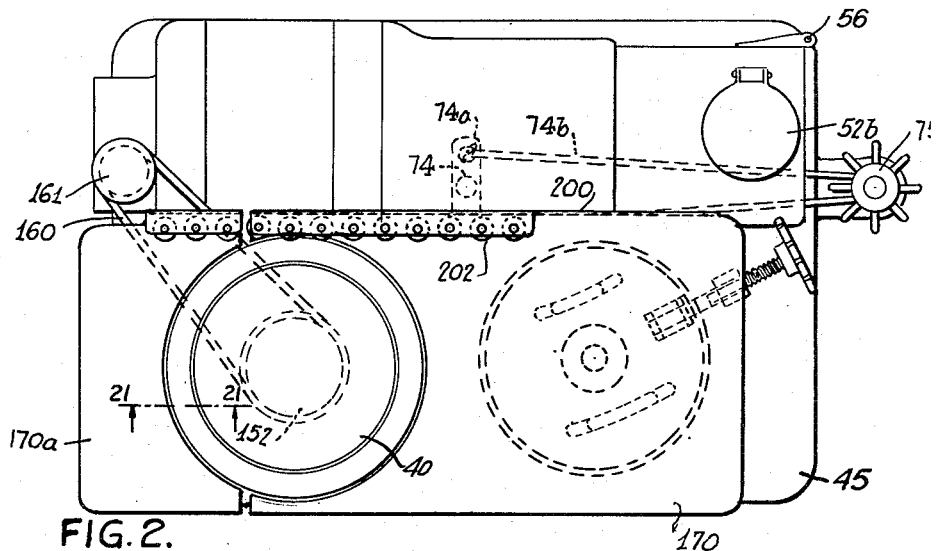
Fig. 2 is a top view thereof.

The machine herein described and claimed comprises several main parts: a food slicing mechanism 30, a food grating or grinding mechanism 31, and a meat grinding mechanism 32. All three mechanisms are connected to and driven by a single electric motor 35. The motor drive to the grater and to the meat grinder is direct, as will hereinafter more fully appear, but the drive to the slicing mechanism is indirect. The motor is connected to a gear box 36, in which speed reducing gears are mounted, said gears are connected to a clutch 37, and the clutch is connected to a belt and pulley mechanism 38 and 39 respectively by which the slicing knife 40 is driven. When desired, the clutch may be disengaged to render the slicing mechanism inactive. Since the grating mechanism 31 and the meat grinding mechanism 32 are directly connected to the motor, they are automatically in operation whenever the motor itself is in operation. If desired, the grating head may be removed from its shaft when the slicer is to be used and similarly with the meat grinding head. Or the drive mechanism of the motor may be retracted from engagement with the vertically grating and meat grinding mechanisms hereinafter to be described.

The grinding mechanism 32 need not be incorporated into the machine unless desired and it is therefore shown solely as a modified construction in Fig. 17 of the drawing. The slicing and grating mechanisms, however, should always be combined in the same machine, although it is conceivable that either mechanism may be mounted and operated separately and independently from the other. For the purposes of the present application, however, and especially for the purposes of the claims herein, it will be assumed that the basic elements of the present machine are the slicing and grating mechanisms. The meat grinding mechanism may be added, if desired. Nonetheless, when said meat grinding mechanism is added to the machine, it should be understood that it is added not as a separate attachment but as an integral part of the machine. See Fig. 17.

A base 45 supports the several parts of the machine hereinabove and hereinafter mentioned. This base may be mounted on a table or store counter or wherever else the operator of the machine may see fit. Mounted on the base is a motor cradle or support 46 and it will be seen in Figs. 3 and 4 that motor 35 is supported on said cradle 46 in such manner that its drive shaft lies on a horizontal line. It will be hereinafter be seen that the motor shaft remains on a horizontal plane both when the cutting action of the grater is horizontal and vertical.

Housing 50 encloses the motor. Affixed to said motor housing is a second housing 51 which encloses the drive mechanism of the grater. A third housing 52 provides a grating chamber 53 and it encloses the grating element 54. A door 55 is hingedly connected to the open end of housing 52 by means of hinge members 56. A latching means 57 operating through hole 58 in said door 55 locks the door in closed position relative to the grating chamber. It will thus be seen that supported by cradle 46 are three interconnected housings 50, 51 and 52 respectively. Housing 51 is preferably firmly affixed to housing 50 but housing 52 is preferably removably fastened to housing 51, so that it may be removed therefrom for cleaning and other purposes.

The motor shaft 60 is keyed to a sleeve 61 which is rotatably mounted in bearing 62. It will be seen in Fig. 5 that sleeve 61 is not hollow but rather solid in that portion which projects forwardly through the bearing and which in Fig. 5 is identified by means of the reference character 64. An annular boss 65 is formed on the back of the grating element 54 and it will be seen that said boss receives the forwardly projecting portion 64 of sleeve 61. A keyway 66 is provided in boss 65 and a corresponding keyway is formed in sleeve portion 64 so that said sleeve portion and said boss may be keyed together in interlocking relationship. To assist in preventing axial displacement of said grating element relative to said sleeve, a spring-urged ball 67 is mounted in the boss for engagement with an annular groove formed in the outwardly projecting end 64 of the sleeve. Thus when the motor is caused to operate its shaft 60, being keyed to sleeve 61, causes said sleeve to engage in corresponding rotary movement. Since the sleeve is keyed to the grating element 54, said element also engages in rotary movement. It is in this manner and by this means that the grating element is caused to operate.

It is not enough that the grating element be caused to rotate: it is at least equally essential that the grating element be movable axially of itself into and out of engagement with the food in grating chamber 53. To provide for such axial movement, bearing 62 is mounted in a second sleeve 70 which is slidably disposed in housing 51. A transverse slot 71 is formed in said second sleeve 70 to accommodate a pin 72. Pin 72 is affixed to an arm 73 which is fastened to a shaft 74. A swingletree 74a is attached to shaft 74 and the two ends of an intermediately looped cable 74b are fastened to the ends of said swingletree. At the forward end of the machine is a control wheel 75 mounted on a shaft around which cable 74b is intermediately looped. When the control wheel is turned in one direction, the swingletree and hence shaft 74 will turn in the same direction; when the control wheel is turned in the opposite direction, the swingletree and the shaft are turned in corresponding direction. This has the effect of causing pin 72 to move along an arcuate line in either direction. Since said pin is slidably disposed in slot 71, this has the further effect of causing linear movement of sleeve 70, the direction of such movement being determined by the direction of movement of the pin. Since said second sleeve carries the bearing which supports the grating element 54, such linear movement of the second sleeve effects corresponding linear movement of the grating element. The grating element may be advanced and retracted, as desired. It should be understood that linear movement of the grating element does not in any way interfere with its rotary movement previously mentioned. The first sleeve 61 is keyed or splined to the motor shaft in slidable relation thereto and it is therefore immaterial what axial position said first sleeve occupies relative to the motor shaft. Other means may be provided for moving the grating element forwardly and backwardly. Such means may resemble the means used on conventional drill presses to advance and retract the drill bit.

Figure 12:
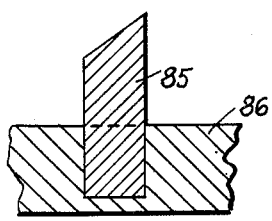
Fig. 12 is an enlarged fragmentary sectional view through the grinding element, showing a grinding or cutting tooth cast into said grinding element, the tooth being made of one metal, say tool or stainless steel, the head of the grinding element being made of another metal, say aluminum alloy.
Figure 13:
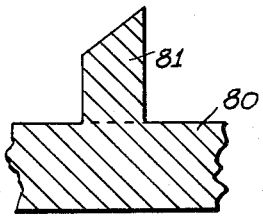
Fig. 13 is a similar view through a modified form of grinding element, showing the grinding tooth cast out of the same material of which the head of the grinding element is cast, both the tooth and the head being cast in the same casting operation.

The grating element is clearly shown in Figs. 3, 5, and 9 to 14 inclusive. Actually these views illustrate several versions or modifications of the grating element of the present invention. The simplest form is shown in Fig. 3. In this form, a disc-shaped head 80 is provided and cutting or grating teeth 81 are formed on said head. A cross sectional view of one of the teeth 81 is shown in Fig. 13. It will there be noted that the tooth and the head are integral with each other and that they constitute a single casting. Each tooth is relatively wide and high to enable it to serve not only as a cutting element but also as a vane or fan blade to generate a current of air against the food which is being ground. It will be noted in Fig. 9 that the teeth are arranged in radial rows and that sizeable spaces appear between adjacent teeth in each row. These rather sizeable spaces are provided so that clogging of the food may be avoided. It will also be noted that the teeth of any one row are staggered with respect to the teeth of the row immediately preceding or following it. This staggered relationship insures full coverage of the food being grated and prevents the formation of uncut circular ridges on the face of the food.

Vane-shaped teeth 81 function exceedingly well as grating elements. But in addition, as has above been mentioned, they serve to generate a strong current of air which is directed against the food in the grating chamber. The effect of the current of air is three-fold: to blow the grated food away from the grating element and toward the outlet end of the grating chamber, thereby keeping the teeth clean and unencumbered with ground food, to produce a pronounced drying effect upon the grated food, especially upon grated cheese, and to blow the grating chamber clear of food, thereby keeping it clean. Hence these vane-shaped teeth may be described as being self-cleaning and their action may be described not only as a grating action but also as a drying action.

The grating head is cast, preferably, of aluminum alloy. It may be found that aluminum is much too soft a material for the teeth of the grating element. It may therefore be found desirable to substitute inserted steel teeth 85 for the cast aluminum teeth 81. These steel teeth may be made of tool steel or any other type of hard steel, such as stainless steel, which retains a sharp cutting edge. These steel teeth may be cast into an aluminum head 86 which corresponds to aluminum head 80 aforementioned. The exposed portion of these steel teeth should correspond in size and shape to the vane-shaped cast teeth above described.

Steel teeth may be provided in still another way. Teeth 88 shown in Fig. 14 may be cast integrally with grating head 89 in precisely the same manner as teeth 81 are cast integrally with head 80. Steel blades 90 may then be screwed by means of screws 91 to the cast teeth 88 in the manner shown in Fig. 14. It will thus be evident that cast teeth 88 serve solely as supports for the steel blades 90 and that said blades provide the grating action of the unit. Since these blades are removable and also replaceable, they may be removed for sharpening purposes, if such be desired or they may be removed for replacement purposes when they are worn to irreparable condition.

Figure 14:
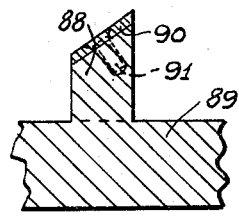
Fig. 14 is still another similar view through a second modified form of grinding element, showing steel grinding or cutting blades removably fastened to the head of the grinding element.
Figure 12A:
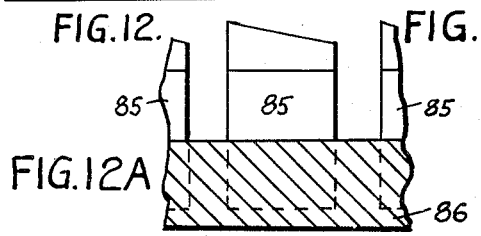
Fig. 12A is a face view of the cutting tooth shown in Fig. 12 showing its very considerable width and also showing the very considerable space between it and its adjacent cutting teeth.

It is the approximately 45° beveled portion of the cutting teeth that engages and grates the food. The beveled surface to which reference is here made is best seen in Figs. 12, 13 and 14 of the drawing. The bevel shown in Fig. 12a is not the bevel to which reference is here being made. It will be noted in Fig. 9 that the teeth are arranged on two spiral lines. The outermost teeth and especially those bearing the reference characters 85a and 85b also engage in a pulverizing action in conjunction with the inner wall of the grating chamber when the outlet door is in closed position. The side edges of teeth 85a and 85b pulverize such food as coffee beans against the inner wall of the grating chamber. Since the outlet door is closed when this operation takes place, the air current which the fan blades and the teeth generate causes the grated food to circulate in the grating chamber and to come into repeated contact with said teeth 85a and 85b. The pulverizing action continues until the food is pulverized to the extent desired.

The fan blades above mentioned are incorporated into the machine when a very strong current of air is to be provided therein. Fan blades or vanes 95 are affixed to the back of the grating head and an air passageway 96 is provided in housing 51 so that vanes 95 may draw air therethrough and direct it through the annular space 97 formed between the grating head and the wall of the grating chamber and propel or drive it against the grated food. It will be seen that a plate 98 is fastened behind the grating head 80. This plate has a hole 99 formed centrally thereof and it will be seen in Fig. 5 that the air from passageway 96 passes through said hole 99 on its way to vanes or blades 95. It will thus be apparent that these vanes function in the manner of impeller blades, sucking air through the central opening 99 and forcing it by means of centrifugal force out through the annular space 97 previously mentioned.

The current of air which the cutting teeth and the fan plates produce has another beneficial effect, especially when foods such as fresh cheese are grated in the machine. The current of air is sufficiently strong to provide a cooling effect upon the cheese and thereby to facilitate the grating operation.

Figure 6:
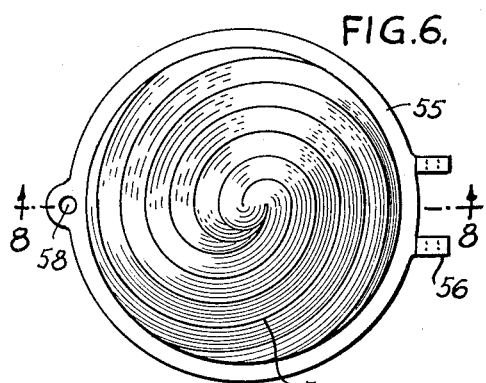
Fig. 6 is an enlarged inside view of the cover on the food grinding chamber.
Figure 7:
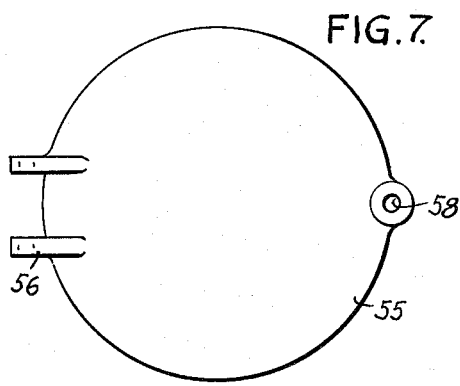
Fig. 7 is an outside view thereof.
Figure 8:
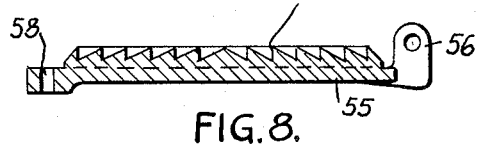
Fig. 8 is a sectional view therethrough on the line 8—8 of Fig. 6.
Figure 9:
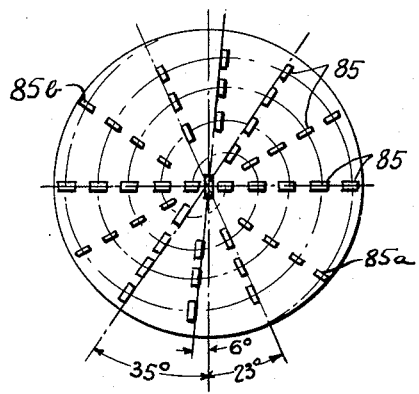
Fig. 9 is a face view of the grinding element.
Figure 10:
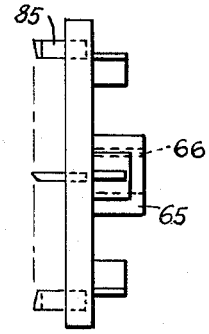
Fig. 10 is a side view thereof.
Figure 11:
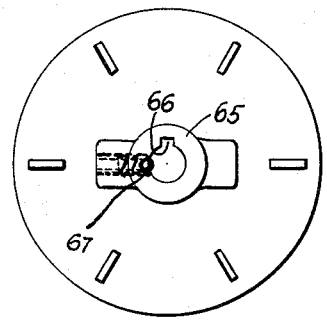
Fig. 11 is a back view of said grinding element, showing the fan blades thereon.

As Fig. 3 clearly shows, the grating element 54 occupies an extreme position in the grating chamber 53, that is, as seen in said figure, the grating element is disposed on the right side or end of said chamber. It is movable leftwardly, however, until it reaches, without actually touching, door 55 to said chamber. This leftward or forward movement of the grating element takes place when the control handle 75 is actuated. The grating element may be moved back to its original position on the right side of the chamber by simply working the control handle 75 in the opposite direction. The door to the chamber is hingedly mounted at the forward end thereof as has above been indicated. The outer side of the door is shown in Fig. 7 and it will there be seen that the outer surface of the door need not have any special features or configurations. The inside surface, however, should be provided with ridges or projections of any desired form to prevent the food from rotating in the grating chamber in response to the rotary movement of the grating element. Figs. 6 and 8 show one form of inner surface which may be useful for this purpose. A plurality of spiral ridges 59 is formed on the inside surface of the door and it will be noted in the cross sectional view of Fig. 8 that these ridges have relatively sharp edges for securely engaging the food.

Food may be fed into the grating chamber in two ways. When the grating mechanism is at rest, door 55 to the grating chamber may be opened and the food which is to be grated may be inserted into the grating chamber through its open front end. Reference is here had to relatively large solid food products such as a large piece of cheese. An opening 52a is formed in the top of housing 52 and it is through said opening that less manageable food products may be introduced into the grating chamber. For example, a plurality of small, irregularly shaped pieces of cheese may be poured into the grating chamber through top opening 52a. The door would, of course, remain closed during this operation, as it remains closed during the course of the grating operation. A hinged door 52b provides a closure for said top opening 52a.

An elongated opening 100 is formed along the bottom of housing 52. This elongated opening is the outlet for the grated food. A hinged door 101 is provided so that outlet opening may be closed completely or opened to any predetermined extent. It is well known that the size of the grated particles is largely controlled by the size of the outlet opening to the grating chamber. Adjustable screw means 102 are provided therefor to determine and control the extent to which the door closes the outlet opening.

The grating mechanism thus far described operates on a horizontal plane. The grating mechanism shown in Fig. 15 operates vertically but in many other essential respects, it is similar to the horizontal mechanism above described. In this embodiment of the invention, a bevel or miter gear 110 is connected to the motor shaft 60. A second bevel or miter gear 111 engages the first gear and drives a vertically extending shaft 112. Grating element 113 is keyed to shaft 112 so that when said shaft is caused to engage in rotary movement by motor 35, said grating element is also caused to engage in rotary movement. Bevel gears 110 and 111 are enclosed in a housing 115 which also serves as a bearing for shaft 112. Housing 115 is fastened to motor housing 50 by conventional means. It has a plurality of holes 116 formed therein so that the vane-shaped teeth 81 of grating element 113 and fan blades 95 may be enabled to draw air into said housing 115 and then direct the air into the grating chamber 118. It will be seen in Fig. 15 that grating chamber 118 is provided in a vertically extending housing 120 which is supported by housing 115. This vertical housing 120 is open at the top to receive the food which is to be grated. A food follower or pusher 121 is provided at the top of said open housing 120 to serve as a closure for the chamber therein. It has a handle 122 so that it may be held in place in the top opening of the housing to seal off said opening and to hold the food in grating engagement with the grating element 113. It also prevents the grated food from being thrown out of the grating chamber through its said inlet opening.

A side opening 125 is provided in housing 120 and it is through said side opening that the grated food leaves the chamber. Control of the size of said opening is afforded by means of door 126, which is slidably mounted on pins 127 and 128 respectively. Compression springs 129 are mounted on said pins and they bear against door 126 to urge it into closed position relative to opening 125. A screw adjusting mechanism 130 is provided to adjust the position of door 126 relative to said opening 125. A detailed view of the door mechanism is shown in Fig. 16.

It will be seen in Figs. 15 and 16 that pins 127 and 128 are mounted in a spout housing 132 which is fastened to vertical housing 120. A spout 133 is formed at the bottom of said spout housing 132. It will thus be seen that the door mechanism last above described is mounted in said spout housing.

This type of vertical arrangement is especially useful where it is desired to grate large quantities of food in one long continuous operation. A chute 251 may therefore be provided for continuous feeding of food into grating chamber 250. The chute may be relatively long and its shape may be such as to enable it to constitute and serve as a hopper. When a chute of this description is used for continuous feeding of food to the grating chamber, there is no need of a pusher 121, since the weight of the food is sufficient to keep it in grating engagement with the grating element. See Fig. 24.

Still another variation in the form of grating mechanism herein disclosed is shown in Fig. 17. In this embodiment of the invention the entire grating mechanism, including its housing occupies a position 90° removed from the position of the grating mechanism and housing shown in Fig. 15. In Fig. 15, spout 133 projects into line with the motor housing. In Fig. 17, spout 133 projects laterally of the motor housing. A shaft 140 is connected to the motor shaft 60 and it will be noted that the two shafts are axially aligned with each other. Shaft 140 extends into meat grinder 32 and it operates the meat grinding mechanism in conventional manner. It will be seen that shaft 140 as well as bevel gears 110 and 111 respectively are mounted in a housing 142 which is fastened to the motor housing and which supports the grating mechanism and housing. The meat grinder 32 is fastened to housing 142 by conventional means. It will thus be seen that there is a direct drive between the motor and the meat grinder. Said meat grinder may be detachably connected to housing 142 so that it may be removed if and when desired without disturbing the grating and slicing mechanism hereinabove and hereinafter described.

The meat grinder may also be a replacement unit adapted to take the place, temporarily of course, of the grating unit. In other words, the grating and meat grinding units may be set up as interchangeable parts. Another variation may be to arrange the meat grinder in vertical relationship to the rest of the machine. It may therefore be connected to the motor in the same manner that the vertical grating mechanism is shown to be attached in Fig. 15. The grating mechanism extends upwardly and the meat grinding mechanism would of course extend downwardly, but the connection with the motor shaft would be identical in both cases. See Fig. 25 wherein vertical grinder 260 takes the place of vertical grater 250 shown in Fig. 24. Shaft 261 and bevel gear 262 of the grinder engage bevel gear 110 and shaft 60 of motor 35. A chute 263 feeds food into the grinding chamber.

A pedestal 150 is mounted on base 45 and it will be seen that said pedestal supports the horizontal cutter 40. At the top of the pedestal is a vertically extending shaft 151 which is supported by a rotatably mounted pulley 152. A set screw or pin 153 in the pedestal engages an annular groove in the shaft to lock said shaft in place. A bearing 154 supports pulley 152 and provides for relatively frictionless rotation thereof. Pulley 152 is connected by means of belt 160 to a second pulley 161 and a clutch pin 162 interengages said pulley 161 with clutch 37. Clutch 37 is connected to a vertical shaft 165 and it will be noted that said vertical shaft projects into gear box 36 where it is connected to the speed reducing gears therein mounted.

It will be apparent from the foregoing that the horizontal drive of the motor is converted by means of gear box 36 and vertical shaft 165 to a vertical drive by which the horizontally disposed cutter 40, supported on pulley 152, is actuated. The gear and the pulley ratios determine the speed of rotation of cutter 40, and there is normally no need to vary the speed once it is set. When it is desired to operate the grating element without at the same time operating the slicing element, clutch pin 162 is caused to disengage clutch 37. Pulley 161 is freely rotatable on shaft 165 and hence when the pin is retracted from clutch 37, the motor and grating mechanism may operate without at the same time causing the slicing mechanism to operate.

Figure 1:
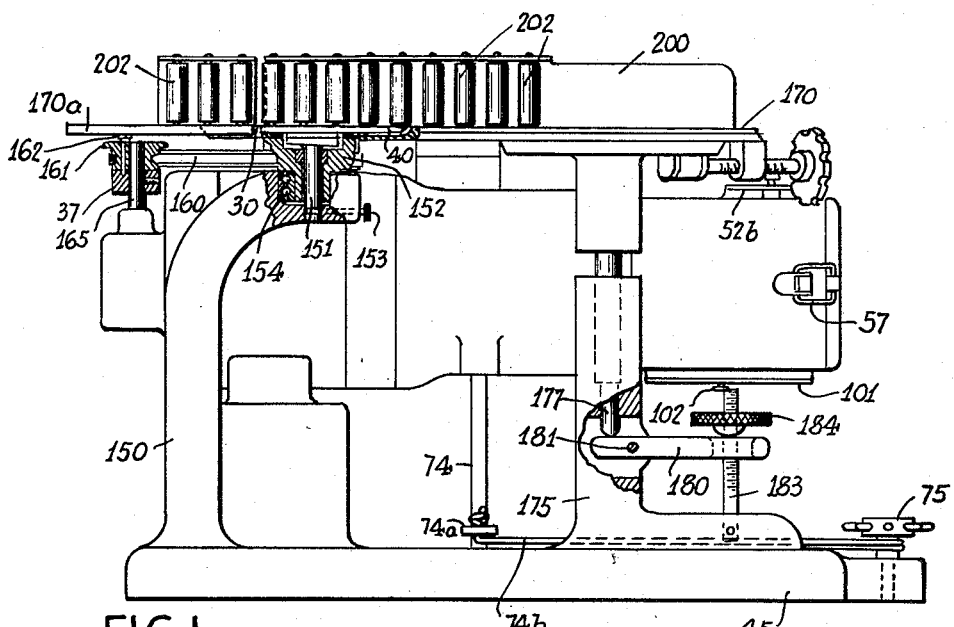
Fig. 1 is a side view of the first form of this invention, showing the slicing element on a horizontal plane and the grinding element movable on a horizontal line, said view being partly broken away to expose part of the driving mechanism of the slicing element.

It will be seen that the slicing element 40 rotates on a fixed horizontal plane. A table 170 is mounted adjacent said cutting element to support the food which is being sliced and this table, unlike the cutting element itself, is adjustable both horizontally and vertically. It is adjustable horizontally to compensate for wear in the slicing element. It is adjustable vertically to control the thickness of the slices. The vertical adjustment mechanism is best shown in Fig. 1. It will there be seen that a pedestal 175 is mounted on base 45 and it will also be seen in Fig. 4 that three posts 176, 177 and 178 respectively are mounted in said pedestal, vertically thereof, for vertical movement relative thereto. A housing 179 is mounted atop the three posts and the table 170 is supported by said housing 179. A horizontally extending arm 180, pivoted at 181 extends into pedestal 175 and engages middle post 177. An adjusting screw 183 is provided in the base of pedestal 175 and a nut 184 on said screw engages said arm 180 on the opposite side of pivot or fulcrum 181. Hence when the nut is turned in one direction on screw 183, arm 180 is caused to raise post 177 and hence housing 179 and table 170. When the nut is turned in the opposite direction on said screw, arm 180 frees said post 177 for downward movement in response to attractive force of gravity acting upon said post and upon said table and supporting housing.

There is a second kind of vertical adjustment or movement of which the table is capable. This movement is for the purpose of bringing a sharpening stone 190 into engagement with the cutting element 40. See Fig. 21. A pair of diagonally extending pins 192 extend partly into the table 170a and partly into the supporting housing 179. A sleeve 193 spaces the table from the housing. Sharpening stone 190 is rotatably mounted on a block 195. The block is slidably connected to table 170a and an adjusting screw 196 is provided to position said block with respect to said table and hence said sharpening stone with respect to the cutting element 40. When it is desired to bring the sharpening stone into engagement with the cutting element, the table is raised slightly in the direction of arrow 197 on pins 192. When the sharpening operation is at an end, the table is simply allowed to descend to its original position in abutment with sleeve 193. This removes the sharpening stone from engagement with the cutting element.

To guide the food as it is moved into and out of engagement with slicing element 40, a guide wall or back stop 200 is provided. This is a vertically extending wall which is horizontally adjustable with respect to the center of said cutting element 40. It carries a plurality of vertically extending rollers 202 against which the food moves as it is pushed into engagement with the cutting element. These rollers facilitate such movement of the food, since they eliminate virtually all friction which would have a tendency to retard such movement. The rollers may be individually removable for cleaning purposes.

A food holder for holding the food which is being sliced is shown in Fig. 26. This holder includes a pair of grippers 275 which are pivotally connected to a crossbar 276, the crossbar has a prong 277 formed thereon, centrally thereof. The food such as a piece of salami 278 is gripped by grippers 275 and it is also engaged by prong 277. A draw bar 279 which is rectangular in cross-section is connected to crossbar 276 and said draw bar is in screw threaded engagement with a knob 280. A housing 281 encloses the draw bar and supports the knob. Grippers 275 function in the manner of bell cranks and they engage arms 282 of housing 281. When the knob is turned in one direction, the grippers are caused to move inwardly against the food and when the knob is turned in the opposite direction, they are caused to move outwardly away from the food. The table of the slicing machine has a pair of tracks or ridges 285 which engage arms 282 of the housing before the grippers are enabled to move into contact with the slicing element. Said tracks or ridges also serve as guides for the food holder.

Fig. 20 shows how the slicing element 40 may be controlled by scale 210. The scale is placed on base 45 immediately below slicing element 40. The scale includes a post or pedestal 212 on base 45 on which a balance 213 is pivotally mounted. The balance is calibrated and each calibration is provided with a notch 214 corresponding thereto. A movable weight 216 is connected to the balance for engagement with any selected notch 214. Atop the balance is a table portion 217 which is situated immediately adjacent and below the slicing mechanism above described to receive the food slices as they fall from said slicing mechanism. A switch 220 is mounted on base 45 immediately below balance 213. When the food on the balance attains the weight to which the balance is set, the balance swings into engagement with switch 220 and causes said switch to open. Switch 220 is a micro-switch whose function is disclosed in the diagrammatic view of Fig. 20. It will there be seen that this micro-switch is connected by means of conductor 221 to a plug 222 and by means of a conductor 223 to motor 35. Another conductor 224 connects the opposite side of the motor to a main switch 225 and a conductor 226 connects said switch to said plug 222. It will therefore be seen that when the main switch 225 is closed, the motor will be enabled to operate providing micro-switch 220 is also closed. When the weight of the food on table 217 reaches the weight for which the balance is set, said balance will engage the micro-switch and cause it to open thereby breaking the circuit to the motor and stopping the slicing action.

The foregoing is descriptive of preferred forms of this invention and it will be readily apparent that these forms may be modified in many ways within the broad scope and spirit of the invention.

I claim:

1. A food grinding machine comprising a base, a housing supported on said base, an electric motor mounted in said housing and rotatable about a horizontal axis, an extensible sleeve keyed to the shaft of said motor for rotary movement therewith, said sleeve being axially movable along the axis of said motor shaft while remaining keyed thereto for rotary movement therewith, manual control means connected to said sleeve for moving said sleeve axially in either direction relative to the motor shaft, a grinding head mounted on said sleeve, coaxially therewith, and within said housing, and a vertical door mounted on the end of said housing directly opposite and facing said grinding head in spaced relation thereto, the space within said housing between the grinding head and the door constituting the grinding chamber wherein food articles may be ground, an opening being formed in the top of said housing above and in communication with said grinding chamber through which articles of food may be inserted into said grinding chamber and a closure for said opening, a second opening being formed at the bottom of said housing below and in communication with said grinding chamber through which the ground articles of food may drop out of said grinding chamber, and an adjustable closure for said second opening, the inside surface of said door which faces the grinding head being provided with projections which are engageable with the articles of food that are placed in the grinding chamber to hold said articles of food against rotary movement when the grinding machine is in operation, said grinding head being provided on the side which faces the door, a plurality of cutting teeth which are disposed in perpendicular relation to said grinding head, said cutting teeth being arranged along radially extending lines to render them accessible for sharpening purposes, some of said cutting teeth being situated along the peripheral edge of the grinding head immediately adjacent the wall of the housing to grind the food between said last mentioned cutting teeth and said housing wall, each cutting tooth constituting a flat bar which is substantially rectangular in shape in cross section, the cutting edge of each tooth being beveled in two directions, from front to back and from side to side, the forwardly directed face of each said cutting tooth having a relatively large area to generate a current of air against the food when the grinding head is caused to engage in rotary movement by the motor acting through said extensible sleeve, whereby the ground food is blown away from the cutting teeth, thereby clearing the cutting teeth for cutting engagement with the food to cut and grind the same.

2. A food grinding machine in accordance with claim 1, wherein a plurality of fan blades are provided on the back side of the grinding head to generate a current of air when the grinding head is caused to rotate, a sufficient clearance being provided between the grinding head and the housing wall to enable said current of air to enter the grinding chamber and to dry the ground food.

3. In a grinder of the type having a cylindrical casing and having an end member for closing the end of said casing, and having an auxiliary rotatable cutting element therein, said cutting element having a face substantially normal to its axis of rotation adapted to coact with said cylindrical end member in the grinding of various materials, said cutting element having teeth thereon, said teeth projecting axially from its face in the direction of said end member, said teeth being of substantially rectangular cross section and being arranged in at least a single spiral, said teeth having cutting edges on their free ends, said cutting edges being at an acute angle to a plane normal to the axis of rotation of said cutting element.

4. A machine of the class described having a rotary slicer, weighing means, driving means for said slicer, adjustable means associated with said weighing means and said driving means whereby to discontinue the operation of said slicer when a definite amount of material has accumulated on said weighing means as said material falls by gravity from said slicer in accordance with the adjustment of said adjustable means, the combination with said machine of: a grinder of the type having a cylindrical casing and having an end member for closing the end of said casing, and having an auxiliary rotatable cutting element therein, said cutting element having a face substantially normal to its axis of rotation adapted to coact with said cylindrical end member in the grinding of various materials, said cutting element having teeth thereon, said teeth projecting axially from its face in the direction of said end member, said teeth being of substantially rectangular cross section and being arranged in at least a single spiral, said teeth having cutting edges on their free ends, said cutting edges being at an acute angle to a plane normal to the axis of rotation of said cutting element.

5. A machine of the class described having a rotary slicer, weighing means, driving means for said slicer, adjustable means associated with said weighing means and said driving means whereby to discontinue the operation of said slicer when a definite amount of material has accumulated on said weighing means as said material falls by gravity from said slicer in accordance with the adjustment of said adjustable means, the combination with said machine of: a grinder of the type having a cylindrical casing and having an end member for closing the end of said casing, and having an auxiliary rotatable cutting element therein, said cutting element having a face substantially normal to its axis of rotation adapted to coact with said cylindrical end member in the grinding of various materials, said cutting element having teeth thereon, said teeth projecting axially from its face in the direction of said end member, said teeth being of substantially rectangular cross section and being arranged in at least a single spiral, said teeth having cutting edges on their free ends, said cutting edges being at an acute angle to a plane normal to the axis of rotation of said cutting element, and means forming part of said adjustable means for discontinuing the operation of said grinder when the operation of said slicer is discontinued.

6. In a grinder of the type having a cylindrical casing and having an end member for closing the end of said casing, and having an auxiliary rotatable cutting element therein, said cutting element having a face substantially normal to its axis of rotation adapted to coact with said cylindrical end member in the grinding of various materials, said cutting element having teeth thereon, said teeth projecting axially from its face in the direction of said end member, said teeth being of substantially rectangular cross section and being arranged in at least a single spiral, said teeth having cutting edges on their free ends, said cutting edges being at an acute angle to a plane normal to the axis of rotation of said cutting element, each of said teeth having sides whereby to force air through the material being ground by said grinder.

7. In a grinder of the type having a cylindrical casing and having an end member for closing the end of said casing, and having an auxiliary rotatable cutting element therein, said cutting element having a face substantially normal to its axis of rotation adapted to coact with said cylindrical end member in the grinding of various materials, said cutting element having teeth thereon, said teeth projecting axially from its face in the direction of said end member, said teeth being of substantially rectangular cross section and being arranged in at least a single spiral, said teeth having cutting edges on their free ends, said cutting edges being at an acute angle to a plane normal to the axis of rotation of said cutting element, an opening for ground material in the lower porton of said cylindrical casing and a manually adjustable closure for regulating the size of said opening.

8. In a grinder of the type having a cylindrical casing and having an end member for closing the end of said casing, and having an auxiliary rotatable cutting element therein, said cutting element having a face substantially normal to its axis of rotation adapted to coact with said cylindrical end member in the grinding of various materials, said cutting element having teeth thereon, said teeth projecting axially from its face in the direction of said end member, said teeth being of substantially rectangular cross section and being arranged in at least a single spiral, said teeth having cutting edges on their free ends, said cutting edges being at an acute angle to a plane normal to the axis of rotation of said cutting element, an opening for ground material in the lower portion of said cylindrical casing and a manually adjustable closure for regulating the size of said opening, said cutting element having fan blades mounted on the face opposite from the face on which said teeth are mounted whereby to force air between said cutting element and the interior of said cylindrical casing.

9. The structure of claim 4, wherein said slicer is provided with a clutch to disconnect the same from said driving means.

10. The structure of claim 5, wherein said slicer is provided with a clutch to disconnect the same from said driving means.

11. The structure of claim 4, wherein said means for disconnecting the operation of said slicer includes an electric circuit and a switch in said circuit adapted to be disconnected by said weighing means.

12. The structure of claim 5, wherein said means for disconnecting the operation of said slicer includes an electric circuit and a switch in said circuit adapted to be disconnected by said weighing means.

13. The structure of claim 5, wherein said means for disconnecting the operation of said slicer and grinder includes an electric circiut and a switch in said circuit adapted to be disconnected by said weighing means.

References Cited in the file of this patent

UNITED STATES PATENTS

| Number | Name | Date |
|---|---|---|
| 984,413 | Back | Feb. 14, 1911 |
| 1,250,555 | Bryan | Dec. 18, 1917 |
| 1,465,505 | Zoergiebel | Aug. 21, 1923 |
| 1,652,132 | Donald | Dec. 6, 1927 |
| 1,889,539 | Campbell | Nov. 29, 1932 |
| 1,890,091 | Maestro | Dec. 6, 1932 |
| 2,085,484 | Van Lammeren | June 29, 1937 |
| 2,138,716 | Truitt | Nov. 29, 1938 |
| 2,165,047 | Gualdoni | July 4, 1939 |
| 2,259,427 | Schlemmer | Oct. 14, 1941 |
| 2,322,306 | McLaren | June 22, 1943 |
| 2,399,153 | Wormeck et al. | Apr. 23, 1946 |
| 2,483,472 | Matarrese | Oct. 4, 1949 |
| 2,495,983 | Richards | Jan. 31, 1950 |

FOREIGN PATENTS

| Number | Country | Date |
|---|---|---|
| 79,333 | Switzerland | Apr. 1, 1919 |
| 184,864 | Switzerland | Oct. 1, 1936 |